United States Patent [19]

Narusawa

[11] Patent Number: 4,792,852
[45] Date of Patent: Dec. 20, 1988

[54] VERTICAL SYNCHRONIZING SIGNAL DETECTION CIRCUIT

[75] Inventor: Sadayuki Narusawa, Hamamatsu, Japan

[73] Assignee: Nippon Gakki Seizo Kabushiki Kaisha, Hamamatsu, Japan

[21] Appl. No.: 908,189

[22] Filed: Sep. 17, 1986

[30] Foreign Application Priority Data

Sep. 25, 1985 [JP] Japan .................................. 60-211972

[51] Int. Cl.[4] ............................................... H04N 5/08
[52] U.S. Cl. .................... 358/153; 358/154; 358/155
[58] Field of Search ............... 358/155, 154, 153, 148, 358/19, 314, 319, 336, 339; 360/38.1

[56] References Cited

U.S. PATENT DOCUMENTS 4,238,770 12/1980 Kobayashi et al. .................. 358/154
4,240,111 12/1980 Meise ................................... 358/155
4,420,775 12/1983 Yamazaki et al. ................... 358/148
4,464,679 8/1984 Wargo .................................. 358/148

Primary Examiner—James J. Groody
Assistant Examiner—David E. Harvey
Attorney, Agent, or Firm—Spensley Horn Jubas & Lubitz

[57] ABSTRACT

A vertical synchronizing signal detection circuit detects a vertical synchronizing signal from a television signal by detecting level of the television signal by sampling the television signal at a plurality of sample points established in a plurality of successive horizontal scanning periods and comparing a pattern of level of the television signal during the successive horizontal scanning periods with a reference pattern on the condition that synchronizing signals each discriminating a horizontal scanning period are accurately detected during these horizontal scanning periods. An erroneous detection of a false vertical synchronizing signal caused by noise or dropout can be prevented.

4 Claims, 5 Drawing Sheets

VERTICAL SYNCHRONIZING SIGNAL DETECTION CIRCUIT

BACKGROUND OF THE INVENTION

This invention relates to a circuit for detecting a vertical synchronizing signal from a television signal.

A television signal contains two kinds of synchronizing signal, i.e., a vertical synchronizing signal and a horizontal synchronizing signal. For separating the vertical synchronizing signal, a frequency separation circuit has been used in the past. This circuit, utilizing the fact that the vertical synchronizing signal contains a relatively low frequency component, separates the vertical synchronizing signal by passing a signal containing both vertical and horizontal synchronizing signals through a low-pass filter. Since, however, rise and fall of the output of the low-pass filter in this frequency separation circuit are not sufficiently clear, start and end of the vertical synchronizing signal cannot be detected so accurately by this circuit. Besides, in a case where a frequency component which is equivalent to a vertical synchronizing signal has been generated due to noise or dropout, such frequency component is likely to be mistaken for vertical synchronizing signal thereby leading to an erroneous detection.

It is, therefore, an object of the invention to provide a vertical synchronizing signal detection circuit capable of accurately detecting a vertical synchronizing signal from a television signal.

SUMMARY OF THE INVENTION

For achieving the above described object, the vertical synchronizing signal detection circuit according to the invention detects a vertical synchronizing signal from a synchronizing signal component by detecting level of the signal component during horizontal scanning periods by sampling the signal component at a plurality of sample points established in the horizontal scanning periods and comparing a pattern of level of the signal component sampled during a plurality of continuous horizontal scanning periods with a reference pattern on the condition that horizontal synchronizing signals are accurately detected during these horizontal scanning periods.

The vertical synchronizing signal detection circuit realizing this principle comprises a horizontal synchronizing signal detection circuit for detecting a horizontal synchronizing signal from a signal containing both horizontal and vertical synchronizing signals, a signal level detection circuit for sampling said signal with respect to sample points established at predetermined time points in horizontal scanning periods and detecting level of said signal during said horizontal scanning period and a circuit for detecting a vertical synchronizing signal when signal levels detected by said signal level detection circuit over a predetermined number of successive horizontal scanning periods have formed a predetermined signal level pattern and the horizontal synchronizing signal has been detected by said horizontal synchronizing signal detection circuit in each of said successive horizontal scanning periods.

According to the invention, a vertical synchronizing signal is detected by the signal level pattern of continuous horizontal scanning periods in each of which a horizontal synchronizing signal is recognized to be produced and, accordingly, a signal occurring due to noise or dropout which appears to be a vertical synchronizing signal can be accurately elmininated and a true vertical synchronizing signal can be detected at a correct timing.

The invention will now be described with reference to a preferred embodiment in conjunction with the accompanying drawings.

DESCRIPTION OF A PREFERRED EMBODIMENT

The following description will be made with respect to a case where this invention is applied to a video disc playback device.

Figure 2:
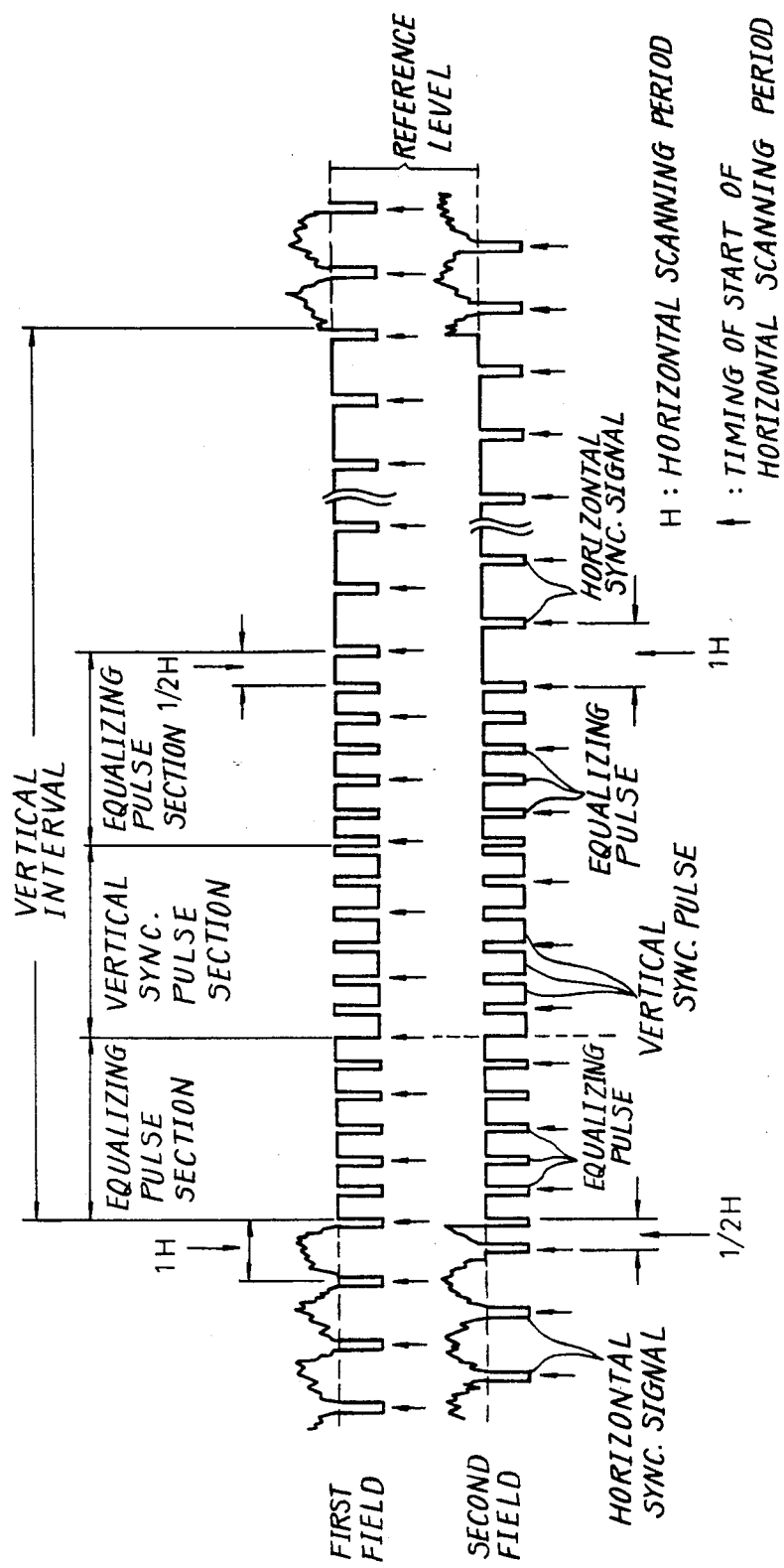
FIG. 2 is a waveform diagram showing composite video signals in first and second fields.

FIG. 2 shows a waveform of a television signal during a vertical interval. A vertical synchronizing pulse has a frequency signal and a pulse width which is wider than that of the horizontal synchronizing signal. There are six shots of equalizing pulses occurring respectively before and after a group of the vertical synchronizing pulses. Each of these equalizing pulses has the same frequency as the vertical synchronizing pulse and a narrower pulse width than the vertical synchronizing pulse.

As viewed with respect to each horizontal scanning period H, during most of the period of the vertical synchronizing pulse section the level of the television signal falls (hereinafter referred to as "low level") from a reference level (vertical blanking level) whereas during most of the period of the equalizing pulse section the signal level is at the reference level (hereinafter referred to as "high level"). Accordingly, if sampling is made at timings excluding those of the horizontal synchronizing pulses and the equalizing pulses in each horizontal scanning period 1H, sampled values of the vertical synchronizing pulse section can become low level whereas sampled values of the equalizing pulse section always become high level and, therefore, a time section corresponding to the vertical synchronizing signals can be detected by detecting the horizontal scanning period 1H in which the sampled values become low level.

In the present embodiment, sampling is made at six points with respect to each horizontal scanning period 1H and a judgement is made that a particular horizontal scanning period 1H is at a low level only when all of sampled values at the six points are at a low level, whereby an erroneous detection of the signal level can be prevented.

If a signal is deemed to be a vertical synchronizing signal merely because some horizontal scanning periods become low level continuously, likelihood of erroneous detection caused by occurrence of noise or dropout cannot be eliminated. In the present embodiment, therefore, a signal is recognized to be a vertical synchronizing signal if a pattern of the signal level in 3H of the vertical synchronizing pulse section and 1H each of the equalizing pulse section occurring immediately before and after the vertical synchronizing pulse interval, totalling 5H, becomes "1, 0, 0, 0, 1" and the synchronizing signals discriminating the scanning period 1H are normally detected in this 5H section.

Figure 1:
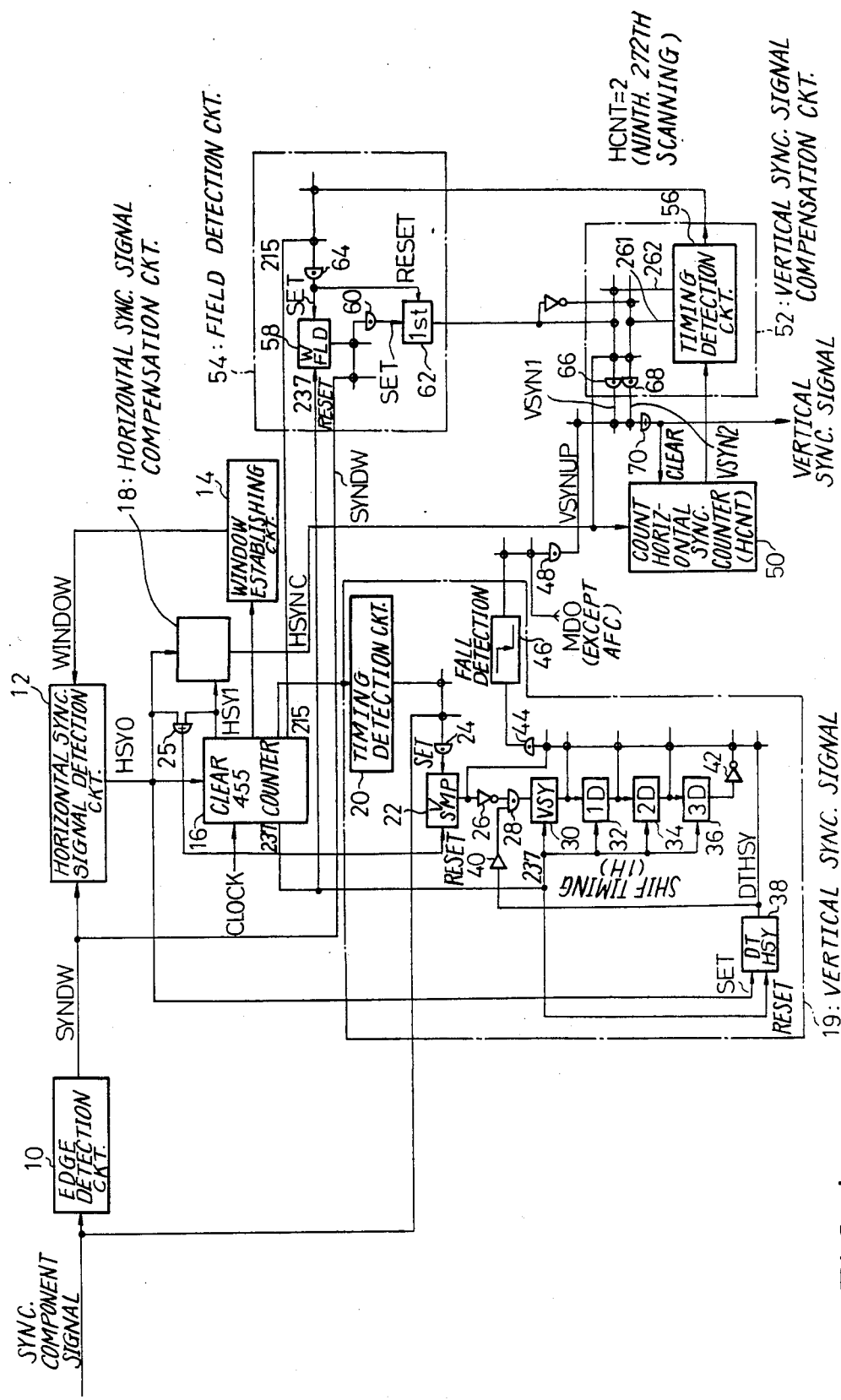
FIG. 1 is a block diagram showing an embodiment of the invention.

A preferred embodiment of the invention is shown in FIG. 1. In FIG. 1, a video component signal is removed from a composite video signal derived from a signal reproduced from a video disc and a synchronizing component signal is applied to an edge detection circuit 10. The edge detection circuit 10 detects falling of the synchronizing component signal excluding one which is apparently deemed to be caused by a noise and produces an assumed synchronizing signal SYNDW. This assumed synchronizing signal SYNDW is applied to a horizontal synchronizing signal detection circuit 12.

The horizontal synchronizing signal detection circuit 12 further removes noise and equalizing pulse components by employing a horizontal synchronizing signal detection window established by a window establishing circuit 14 and thereby takes out a horizontal synchronizing signal HSYO.

A 455 counter 16 counts a clock produced from a crystal oscillator output and is cleared each time the horizontal synchronizing signal HSYO is produced. In a normal state, it counts 455 during one horizontal scanning period 1H. The window establishing circuit 14 establishes, in response to the count of the 455 counter 16, a window in a time section in which a next horizontal synchronizing signal HSYO is expected to occur.

When the horizontal synchronizing signal HSYO has not been detected within the window, a horizontal synchronizing signal compensation circuit 18 produces, as a substitution signal therefor, a signal HSYI at the 455-th count of the 455 counter 16. The compensation circuit 18 therefore provides the signal HSYO or HSYI as a horizontal synchronizing signal HSYNC always once during one horizontal scanning period 1H. Owing to this arrangement, the horizontal synchronizing signal HSYNC is regularly produced even during an abnormal rotation or stopping of a spindle motor for a video disc whereby a timing signal corresponding to the scanning line number is accurately generated.

In a vertical synchronizing signal detection circuit 19, a timing detection circuit 20 designates timings of sampling during each horizontal scanning period in response to the count of the 455 counter 16. In this embodiment, sampling is made at six sampling points in each horizontal scanning period 1H. In performing the sampling, conditions that sampling should not be made at timings of the equalizing pulses and color burst timings and that sufficient sampling interval should be provided must be considered. Taking these conditions into consideration, six points of counts 80, 88, 96, 104, 112 and 120 of the 455 counter 16 are selected as the sampling timings.

A VSMP register 22 holds results of sampling in each horizontal scanning period 1H. When any one of the six points designated by the timing detection circuit 20 has become "1", the VSMP register 22 is set through an AND gate 24 (the symbols on the input terminal side of the AND gate 24 in FIG. 1 represent that the output of the timing detection circuit 20 and the synchronizing component signal are applied) whereby the state of present synchronizing component signal is judged to be "1" signifying that it is not the vertical synchronizing pulse section. When all of the sampled values at the six points have become "0", the VSMP register 22 is not set whereby the state of the present synchronizing component signal is judged to be "0" signifying that it is apart of the vertical synchronizing pulse section. The VSMP register 22 is reset through an OR gate 25 each time the horizontal synchronizing signal HSYO or the substitution signal HSYI has been detected.

The output of the VSMP register 22 is successively shifted to a VSY register 30, 1D register 32, 2D register 34 and 3D register 36 through an inverter 26 and an AND gate 28 every horizontal scanning period 1H and detection of the signal pattern is made through this process.

A DTHSY register 38 enables the signal from the VSMP register 22 to be applied to the VSY register 30 only when the horizontal synchronizing signal HSYO is available. The DTHSY register 38 is set by the horizontal synchronizing signal HSYO and reset at a timing of the 237-th count of the 455 counter 16. Upon setting of the DTHSY register 38, a signal DTHSY is produced and this signal causes the AND gate 28 to be enabled through a delay element 40 thereby enabling the signal from the VSMP register 22 to be applied to the VSY register 30. When the horizontal synchronizing signal HSYO is not available, the DTHSY register 38 is not set so that the AND gate 28 is not enabled and transmission of the signal from the VSMP register 22 to the VSY register 30 is not effected.

The VSY register 30 receives the output of the VSMP register 22 at each timing of the 237-th count of the 455 counter 16 after completion of the sampling at the six points and holds it. The signal transmitted to the VSY register 30 is successively shifted to the 1D register 32, 2D register 34 and 3D register 36 at each timing of the 237-th count of the 455 counter 16.

In the foregoing manner, results of the sampling for successive 5H periods are successively shifted among the five registers. The outputs of the VSMP, VSY, 1D and 2D registers 22, 30, 32 and 34, a signal derived by inverting the output of the 3D register 36 by an inverter 42 and the output of the DTHSY register 38 are applied to an AND gate 44. The AND gate 44 is switched on only when the horizontal synchronizing signal HSYO is available (i.e., DTHSY="1") and the pattern of the signal level for the continuous 5H period is "1, 0, 0, 0, 1" which exists only in the 5H period consisting of the vertical synchronizing pulse section (3H) and 1H each before and after it. By this arrangement, an erroneous detection due to noise or dropout can be eliminated and the vertical synchronizing signal can be accurately detected. Besides, time point at which the vertical synchronizing signal occurs can also be accurately detected.

The output of the AND gate 44 is applied to a fall detection circuit 46 in which falling thereof is detected.

The output of the fall detection circuit 46 is delivered out as a vertical synchronizing signal VSYNUP through an AND gate 48 when a control(e.g., PLL) other than AFC to be described later is indicated by a signal $\overline{MDO}$.

A horizontal synchronizing counter 50 in the case of the second field counts the number of a scanning line which is presently being scanned in one field. The counter 50 counts up the horizontal synchronizing signal HSYNC and is cleared by the vertical synchronizing signal VSYNUP.

A vertical synchronizing signal compensation circuit 52 produces a substitution signal VSYN1 or VSYN2 when the vertical synchronizing signal VSYNUP is not available. Since timing at which the vertical synchronizing signal VSYNUP is produced is different between the first field and the second field, a timing detection circuit 56 produces, on the basis of detection of the field by a field detection circuit 54 to be described below, the substitution signal VSYN1 at a timing of the 262-nd count of the horizontal synchronizing counter 50 in the case of the first field and the substitution signal VSYN2 at a timing of the 261-st count of the counter 50.

Figure 3:
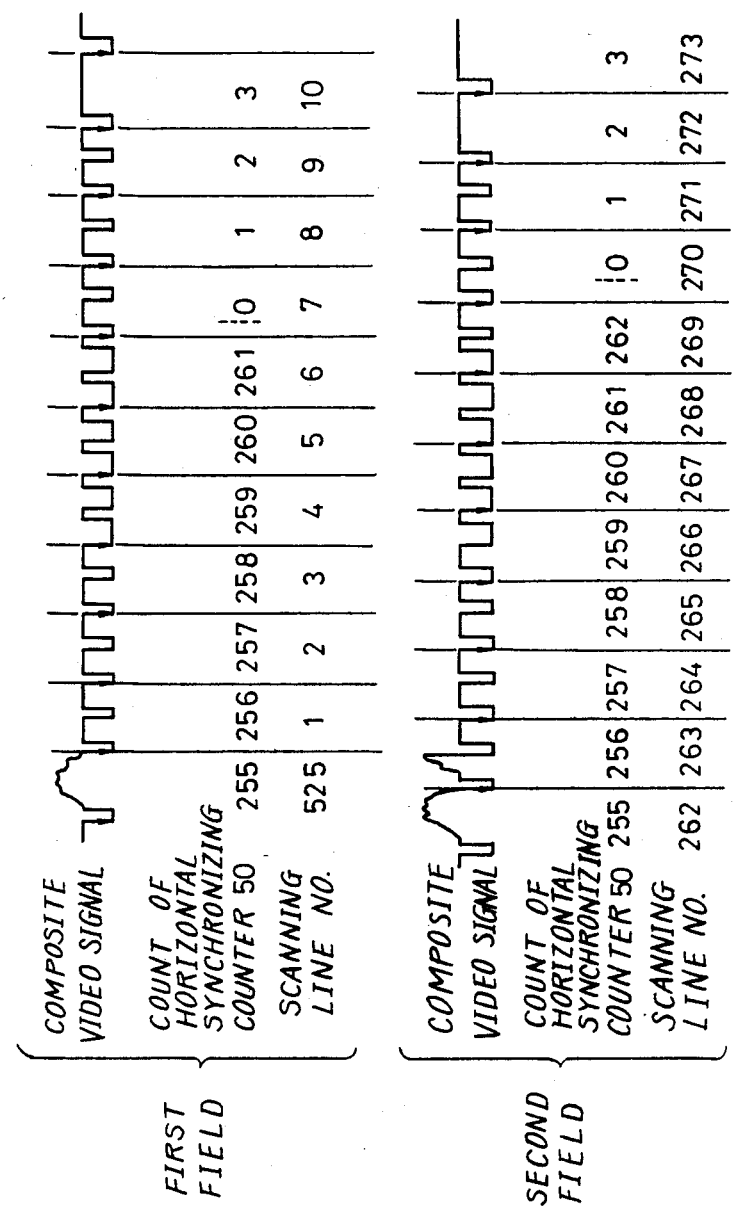
FIG. 3 is a diagram showing relationship between counts of horizontal synchronizing counters 50 in the first and second fields and scanning line number.

The field detection circuit 54 detects whether the present field is the first field or the second field. As shown in FIG. 3, if there exists the fall portion of the synchronizing component signal (i.e., equalizing pulse) in the middle of the count 2 of the synchronizing counter 50 (the scanning line number 9 in the first field and the scanning line number 272 in the second field), the field is deemed to be the first field whereas if there does not exist such fall portion, the field is deemed to be the second field.

The field detection circuit 54 comprises a WFLD register 58. The WFLD register 58 is set through an AND gate 64 at a timing of the 215-th count of the 455 counter 16 when the ninth or 272-nd scanning is indicated by the timing detection circuit 56 and is reset at a timing of the 237-th count of the 455 counter 16. In other words, the WFLD register 58 becomes a set state in the middle of the ninth and 272-nd scanning and produces a signal "1". An AND gate 60 receives the output of the WFLD register 58 and the assumed synchronizing signal SYNDW from the edge detection circuit 10. In the case of the first field, the assumed synchronizing signal SYNDW is applied in the middle of the ninth scanning indicated by the WFLD register 58 so that the AND gate 60 is switched on and sets a first field register 62. Thus, the field is detected to be the first field. The first field register 652 is reset at the beginning of the 272-nd scanning of a next field.

In the case of the second field, the assumed synchronizing signal SYNDW is not applied in the middle of the 272-nd scanning indicated by the WFLD register 58 and, accordingly, the first register 62 is not set. Thus, the field is judged to be the second field.

In the vertical synchronizing compensation circuit 52, an AND gate 66 is switched on to produce the substitution signal VSYN1 and thereby resets the horizontal synchronizing counter 50 through an OR gate 70 when the first field register 62 is set (i.e., when it is the first field), the count of the horizontal synchronizing counter 50 is 262 and the horizontal synchronizing signal HSYNC is available. An AND gate 68 is switched on to produce the substitution signal VSYN2 and thereby resets the horizontal synchronizing counter 50 through the AND gate 70 when the first field register 62 is reset (i.e., when it is the second field), the count of the horizontal synchronizing counter 50 is 261 and the horizontal synchronizing signal HSYNC is available.

In the foregoing manner, the vertical synchronizing signal compensation circuit 52 produces the substitution signal VSYN1 or VSYN2 at an accurate time piont in each first field and second field. Accordingly, the OR gate 70 gates out the vertical synchronizing signal VSYNUP or its substitution signal VSYN1 or VSYN2 at least once every field.

Figure 4:
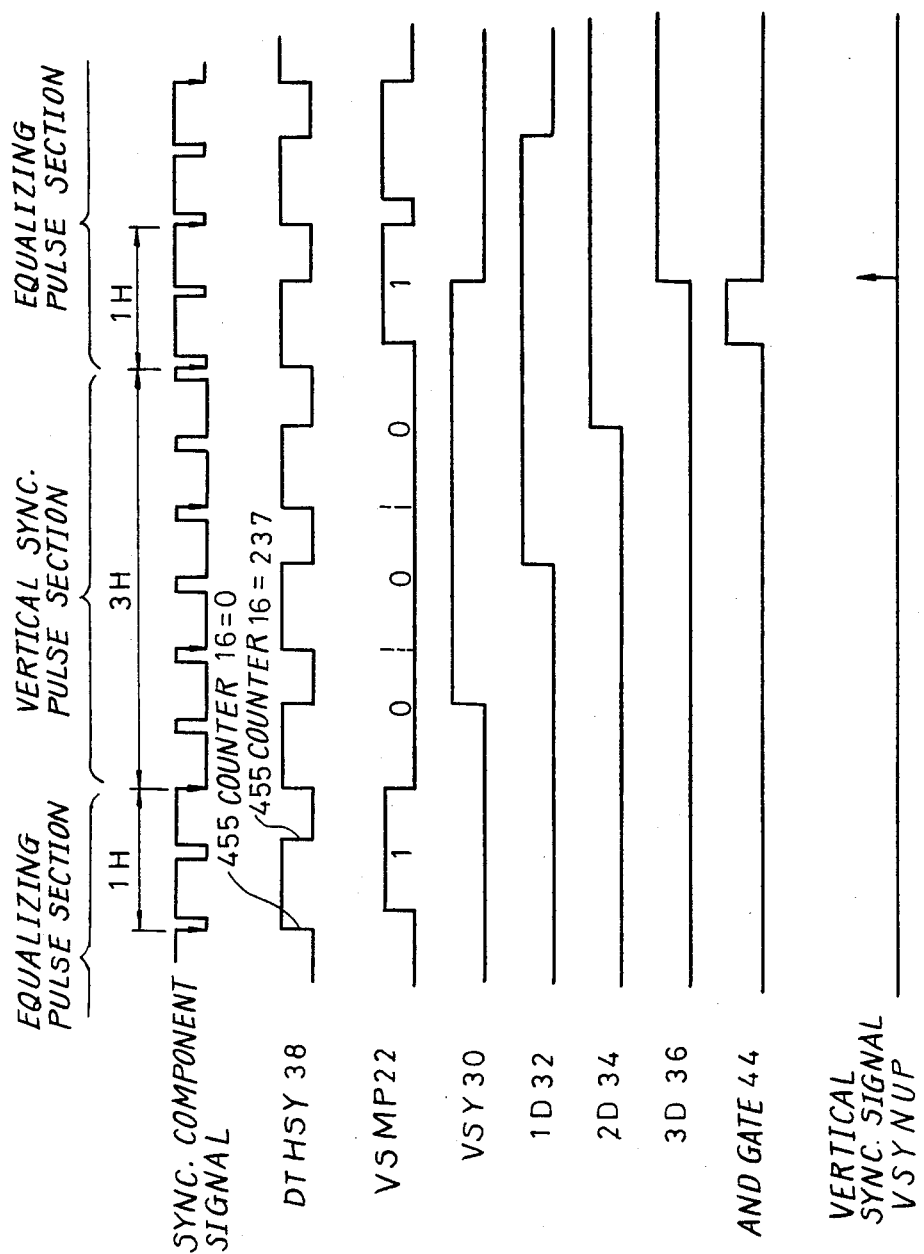
FIG. 4 is a time chart showing operation in the first field in the circuit of FIG. 1.

The operation of the circuit of FIG. 1 in the first field is shown in FIG. 4. When the signal pattern of the 5H period consisting of the 3H vertical synchronizing pulse section and the 1H equalizing pulse sections before and after the vertical synchronizing pulse section has become "1, 0, 0, 0, 1", the AND gate 44 is switched on, the fall portion of the signal pattern is detected by the fall detection circuit 46 and the vertical synchronizing signal VSYNUP is produced.

Figure 5:
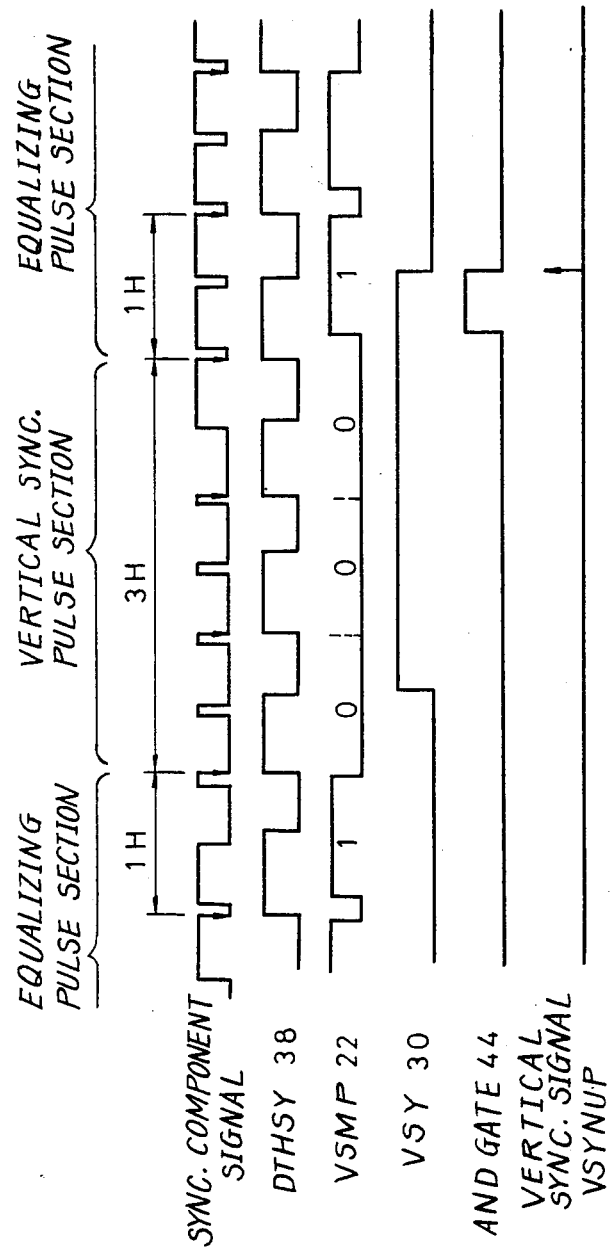
FIG. 5 is a time chart showing operation in the second field in the circuit of FIG. 1.

The operation of the circuit of FIG. 1 in the second field is shown in FIG. 5. In the case of the second field also, when the signal pattern of the 5H period has become "1, 0, 0, 0, 1", the AND gate 44 is switched on, the fall portion of the signal pattern is detected by the fall detection circuit 46 and the vertical synchronizing signal VSYNUP is produced.

When the disc spindle motor control is AFC (Auto Frequency Control: a rough rotation control based on frequency comparison between the frequency generator ouptut and a reference clock which is used when the disc rotation is deviated widely from a normal rotation as in starting of the motor), an accurate vertical synchronizing signal cannot be obtained so that the signal $\overline{MDO}$ is turned to "0" to switch off the AND gate 48 and the vertical synchronizing signal is substituted by the signal VSYN1 or VSYN2 produced by the vertical synchronizing signal compensation circuit 52.

What is claimed is:

1. A vertical synchronizing signal detection circuit comprising:

a horizontal synchronizing signal detection circuit for receiving an input signal containing horizontal synchronizing pulse signals, vertical synchronizing pulse signals and equalizing pulse signals, the detection circuit providing an output identifying horizontal scanning periods from the input signal;

a signal level detection circuit for providing a sample of said input signal representing the level of said input signal for at least one predetermined time point in each horizontal scanning period and detecting the level of each sample;

a counter counting a clock and being cleared by the output of the horizontal synchronizing signal detection circuit, wherein said signal level detection circuit provides each sample by detecting levels at plural predetermined time points within an expected time frame of an individual vertical synchronizing pulse signal occurring within a horizontal scanning period as determined by the count of said counter; and a circuit for providing a vertical synchronizing signal when the sample levels detected by said signal level detection circuit over a predetermined number of successive horizontal scanning periods correspond to a predetermined signal level pattern and the respective horizontal scanning periods have been identified by said horizontal synchronizing signal detection circuit.

2. A vertical synchronizing signal detection circuit as defined in claim 1 wherein said signal level detection circuit further comprises register means which is set when all of said levels of plural time points are at one of two signal levels and is not set when at least one of said levels of plural time points is at the other signal level.

3. A vertical synchronizing signal detection circuit as defined in claim 2 wherein said predetermined signal level pattern has a pattern of a vertical synchronizing pulse section of a predetermined number of horizontal scanning periods and equalizing pulse sections of respectively one horizontal scanning period occurring immediately before and after said vertical synchronizing pulse section.

4. A vertical synchronizing signal detection circuit as defined in claim 2 wherein said input signal is a reproduced signal from a video signal.

* * * * *